(12) United States Patent
Lide et al.

(10) Patent No.: US 6,657,997 B1
(45) Date of Patent: Dec. 2, 2003

(54) TRANSPORTING ABCD BITS USING RTP

(75) Inventors: David Lide, Rockville, MD (US); Manoj Sindhwani, Herndon, VA (US); William Mills, Montgomery Village, MD (US); Zoran Mladenovic, Bethesda, MD (US); Edward Morgan, Gaithersburg, MD (US)

(73) Assignee: Telogy Networks, Inc., Dallas, TX (US)

( * ) Notice: Subject to any disclaimer, the term of this patent is extended or adjusted under 35 U.S.C. 154(b) by 736 days.

(21) Appl. No.: 09/597,895

(22) Filed: Jun. 19, 2000

(51) Int. Cl.[7] .................... H04L 12/66; H04L 12/28; H04J 3/24
(52) U.S. Cl. .................... 370/356; 370/392; 370/474
(58) Field of Search .................... 370/352–356, 370/357, 401, 466, 467, 474, 471, 392, 394, 231, 476

(56) References Cited

U.S. PATENT DOCUMENTS 6,304,567 B1 * 10/2001 Rosenberg .................... 370/356
6,519,259 B1 *  2/2003 Baker et al. .............. 370/395.4
6,594,280 B1 *  7/2003 Chapman .................... 370/469

* cited by examiner

*Primary Examiner*—Duc Ho
(74) *Attorney, Agent, or Firm*—Warren L. Franz; W. James Brady; Frederick J. Telecky, Jr.

(57) ABSTRACT

The transport of ABCD bits in a digital packet network is facilitated by the inclusion of the ABCD bits into the RTP header of the digital packets. The ABCD bits are first placed in the unused bits of the RTP header. Redundancy of the previous ABCD bits, when applicable, is achieved by restricting the size of fields in the header to reserve space for redundant ABCD bits. The ABCD bits are placed in the reserved portions of restricted header fields.

7 Claims, 2 Drawing Sheets

TRANSPORTING ABCD BITS USING RTP

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to transmission of the four CAS signaling bits (ABCD) of the extended frame of a time division multiplex signaling format over packet networks. In particular, the present invention relates to effective embedding of the ABCD bits in the RTP header of a VoIP packet. The present invention can also be applied to transport AB bits.

Voice over packet networks or VoIP requires that the voice or audio signal be packetized and then transmitted. The transmission path will typically take the packets through both packet switched and circuit switched networks between each termination of the transmission. The analog voice signal is first converted to a digital signal and compressed. The conversion and compression can be accomplished at a single gateway connected between a terminal equipment and the packet network or can be performed separately. A pulse code modulated (PCM) digital stream from the analog voice can be produced at a gateway or elsewhere.

The PCM stream is analyzed in the gateway and processed according to the parameters of the gateway, such as echo suppression, silence detection and DTMF tone detection. Detected tones are passed separately without encoding. The voice PCM samples are passed to a codec for processing prior to packet assembly.

The codec creates voice frames from the PCM stream according to the parameters of the codec used. The creation of frames from the PCM stream typically includes compression. The frames are of a set time duration and contains a set number of bits of the PCM stream.

The frames are then assembled into packets by a packet assembler which combines a set number of sequential frames into a single packet. A real time protocol (RTP) header is attached to each packet to provide a sequence number for identification of the packet and a time stamp for the packet. The gateway then determines the IP address corresponding to the designated destination of the voice signal to which the packet belongs. A UDP header containing source and destination "sockets" is added to the packet. A IP header is also added to the packet to designate the origination and destination IP addresses for the packet.

The packet is routed through the packet network based upon the IP address information. The packet may pass through several switches and router and may pass through packet switches. The packet may travel through more than one PSTN and may experience robbed bit signaling. The packet will also accumulate delay as it passes between the near and far end terminal equipment, through the near and far end gateways through the packet and PSTN networks and switches. The packet can alternatively travel in a large variety of alternative routes from source to destination.

Because this accumulated delay is erratic and unpredictable and further because each packet may take a different path through the networks, delay can cause the packets to arrive out of sequence and/or with gaps or overlaps. Gapping and overlapping of packets is referred to as jitter. Conditions in the packet network can also result in packet loss.

Voice packets are generated at a constant rate at the gateway from a continuous audio signal such as speech, and represent continuous and ordered speech. The packets should be played out at the receiving end in the same order and at the same rate to accurately reproduce the original analog speech. Because of some inherent loss and delay in a packet network, the packets are reassembled and played out as close to the original order and sequence as possible to achieve acceptable reproduction.

The receiving gateway will first remove the IP and UDP headers from the packets. Next the RTP information is read and the voice frames extracted from the packet. The RTP information is used to ensure that the frames are in the proper order. If a packet is missing, or out of order, the gateway must compensate for the missing frames in that packet in order to avoid undesirable distortion of the voice signal after frame reassembly. If one or more frames in a sequence are missing, the previous frame is repeated at a decreased volume to fill in the gap(s) left by the missing frame(s). If the missing frame subsequently arrives, too late for inclusion in the reassembled sequence of frames, the packet is discarded.

In order to compensate for jitter, the receiving gateway utilizes the sequence and time stamp of the RTP header to smooth the playout by compensating for jitter and/or packet loss by removing gaps and overlaps in the frame sequence.

The reassembled sequence of frames is processed in a codec to return the PCM stream for playout.

SUMMARY OF THE INVENTION

The present invention teaches a method for transporting signaling bits by including the bits in a voice stream header that is being encapsulated by the Real Time Protocol (RTP). This method has several advantages over alternative techniques, especially when voice is being transmitted over a cable data network. The present invention also has the advantage in a network where the bandwidth on the packet network is limited and is pre-allocated.

The present invention has the advantage that the packet requirement is predictable, allowing for network management and pre-allocation of packets. With the present invention, ABCD bits are generated only as often as a packet is sent. The present invention eliminates the generation of extra packets simply for the transmission of ABCD signaling and eliminates the displacement of voice data by packets dedicated to ABCD bits. Because bits are transmitted with each voice packet, they are transmitted at a regular rate. If ABCD bits require a separate packet generation, repeated activity which generates ABCD signaling, such as on-hook/off-hook activity will generate extra bits, changing bandwidth requirements. With the present invention, generation of extra ABCD bits, such as repeated on-hook/off-hook activity, does not change bandwidth requirements.

RTP is the protocol of choice for encapsulating packet voice. With RTP, digital voice samples are collected, possibly compressed (if a compression codec is used), and packetized. Typically 10 milliseconds or more of voice is collected into one packet. An RTP header is added to the voice payload. This header is typically 12 bytes as illustrated in FIG. 2, and includes the following fields: protocol version, source identifier, timestamp of the voice samples in the packet, the type of voice payload in the packet (i.e. codec being used), the packet sequence number and CC—Contributing sources (in the case of a voice conference).

The present invention recognizes several alternative schemes to transport ABCD signaling bits in parallel with the RTP voice stream:

The first approach is to use a separate RTP payload type, whereby the ABCD bits are placed into a packet, an RTP header is attached with a payload type indicating that the packet contains ABCD signaling bits and not voice. This packet can then be inserted into the RTP voice stream and transported to the other side. These ABCD relay packets need only be transmitted when the ABCD state changes.

A second approach is to embed the ABCD bits in the user-defined areas of the RTCP packets. This approach is similar to the first approach, except that it would use the RTCP channel to send and receive the ABCD bits whenever an ABCD transition occurs.

A third approach is to use the signaling protocol to transport these bits.

Each of these approaches is feasible, but each has some disadvantages in many transmission environments, such as direct PSTN connectivity in a cable data network environment.

The present invention teaches a preferred embodiment for transporting ABCD bits using RTP in a packet network. The preferred exemplary method taught herein is to borrow bits from unused or inapplicable fields or to borrow bits by restricting portions of header fields in the RTP header of each voice packet. In transparent or non-switched mode, RTP voice streams will only have two participants, i.e., the called and calling parties. No conferencing will be present so that the CC field in the RTP header (see FIG. 2) will be 0, i.e.; there will never be any additional contributing sources.

The CC field is 4 bits long and thus can be used to hold a snapshot of the current ABCD state of the endpoint. With this approach, ABCD bits will be transmitted at the voice packet rate, e.g., 10 ms voice will generate ABCD samples at a 10 ms rate as well. In a T1 line, ABCD bits for a voice channel are generated every 3 ms. If this resolution is required, additional bits can be squeezed out of the RTP header by restricting the SSRC field (normally 32 bits), to fewer bits. For 3 ms resolution, the SSRC field would be restricted to 32−8=24bits. The borrowed 8 bits of the SSRC field are then used to hold two additional ABCD samples, giving a total of 3 ABCD samples in one 10 ms voice packet, thus approximating the T1 resolution. This approach again takes advantage of the point-to-point-calling environment; wherein the 32-bit space of the SSRC field is used to support large conference applications. This approach can be extended to E1 applications, where ABCD bits are sampled every 2 ms. In this case the SSRC field would be restricted to 16 bits, and each 10-ms-voice packet would hold 5 ABCD samples.

As a practical matter, the ITU recommendation 1.366.2, Annex L recommends 5 ms ABCD samples (during a period of ABCD transition). This sample rate can be handled by restricting the SSRC field to 28 bits.

There are several advantages to this approach over others in the voice over cable networks. The major advantage is that the ABCD bits, because they are transmitted as part of the voice stream, can make use of the same quality of service mechanism as the voice. In addition there is a bandwidth savings based on the inclusion of ABCD within packets already allocated. This is of particular importance in a voice over cable application, where the cable data network is using the DOCSIS unsolicited grant service for upstream data transmission. With this service, upstream bandwidth in a DOCSIS network is committed at call set up time. For example, a call that is set up to use 10 ms G.711 voice, will request sufficient upstream transmission slots to transmit 92 bytes (80 bytes of voice samples plus 12 bytes of RTP header) every 10 ms (assuming DOCSIS payload header compression is enabled). These slots will then be granted to the endpoint every 10 ms with minimal jitter to ensure voice quality. The issue with using the ABCD RTP relay approach, the first approach discussed above, is that the inserted ABCD packets will occur at a variable rate, thus forcing some kind of scheme to acquire the additional upstream bandwidth. This will be difficult because of the fact that these ABCD packets will only be generated when ABCD transitions are observed, making any polled or unsolicited upstream service impractical. Thus, like the RTCP approach, the second approach described above, a best effort DOCSIS upstream service would be required.

This approach also has the advantage that no additional resources are required to transmit the ABCD bits as they replace unused bits in the RTP header.

The implementation of the approach taught in the present invention must accommodate conditions which would limit the transmission of ABCD signaling, in the manner taught herein. In voice over IP, silence (periods without voice) are often suppressed (no packets are transmitted) in order to save bandwidth and processing. Suppression of silence is referred to as VAD. When silence is detected for a predesignated threshold period of time, no packets are transmitted until voice is again detected. If silence suppression is enabled, the approach of the present invention, embedding ABCD signaling in the RTP header, has the disadvantage of the lack of generation of ABCD bits during silence periods. The present invention teaches that if an ABCD transition is detected during a silence period, a Silence Packet is generated and ABCD bits are inserted into the RTP header. The silence packet is then transmitted in lieu of a voice packet. The method of the present invention also teaches that in the event that the ABCD bits have not changed no silence packet is sent.

If large voice packet sizes are used, e.g. greater than 10 ms of voice, then ABCD samples will be forwarded less frequently. For example, with 40 ms voice, and assuming one ABCD sample per packet, only 25 ABCD samples will be transmitted per second. In certain applications, this might not be acceptable. Stealing SSRC bits will offset this problem up to a point, but in general this approach should be restricted to cases where the packet size is less than 60 ms. This can also be used for redundancy in the event of lost packets.

BRIEF DESCRIPTION OF THE DRAWINGS

For a better understanding of the nature of the present invention, reference is had to the following figures and detailed description, wherein like elements are accorded like reference numerals, and wherein.

DETAILED DESCRIPTION OF PREFERRED EXEMPLARY EMBODIMENTS

Figure 1:
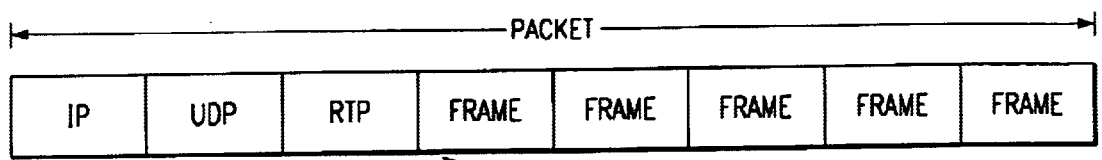
FIG. 1 is a diagram illustrating a typical packet.
Figure 2:
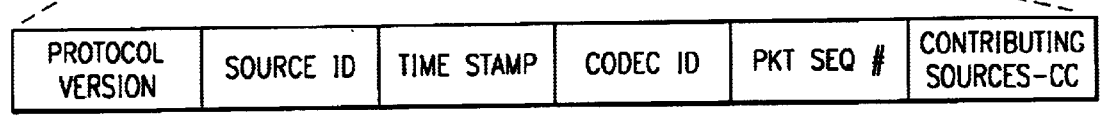
FIG. 2 is a block diagram illustrating the components of an RTP header of a typical packet.
Figure 4:
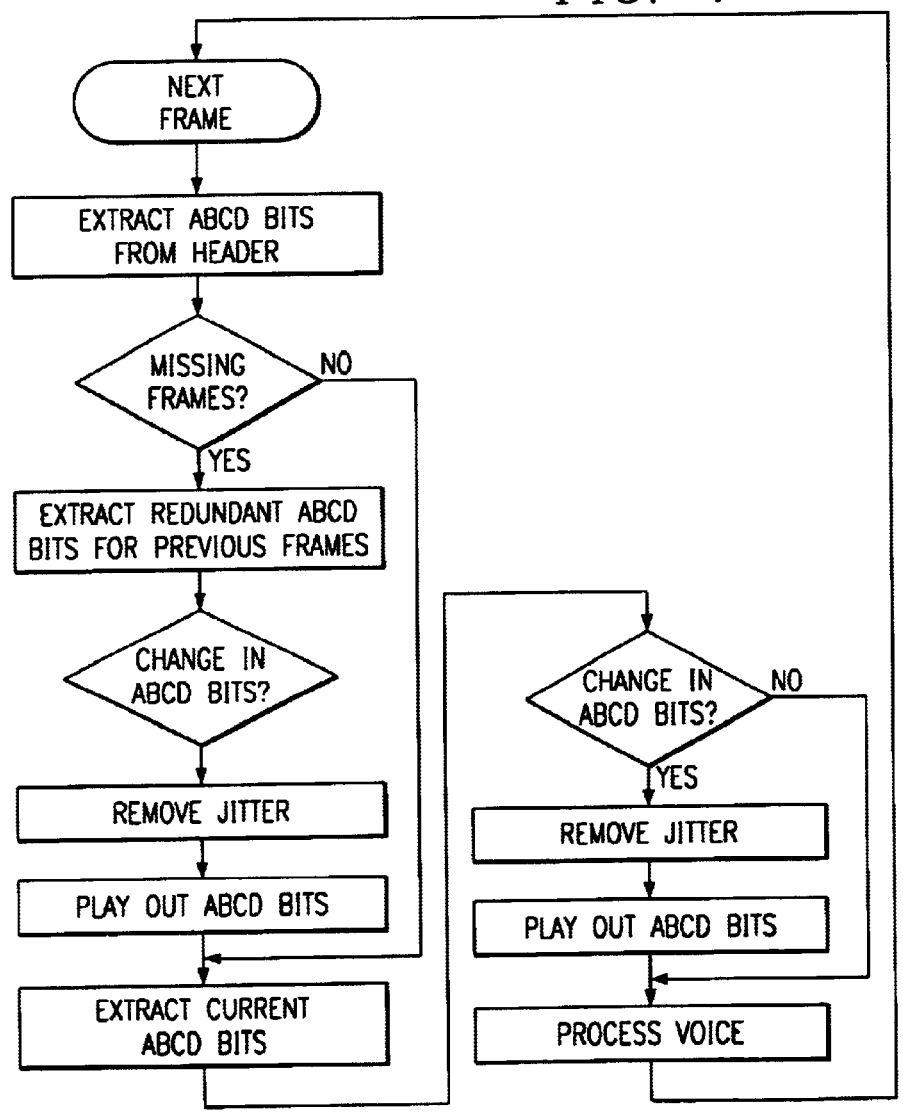
FIG. 4 is an exemplary flow diagram illustrating packet receipt.
Figure 3:
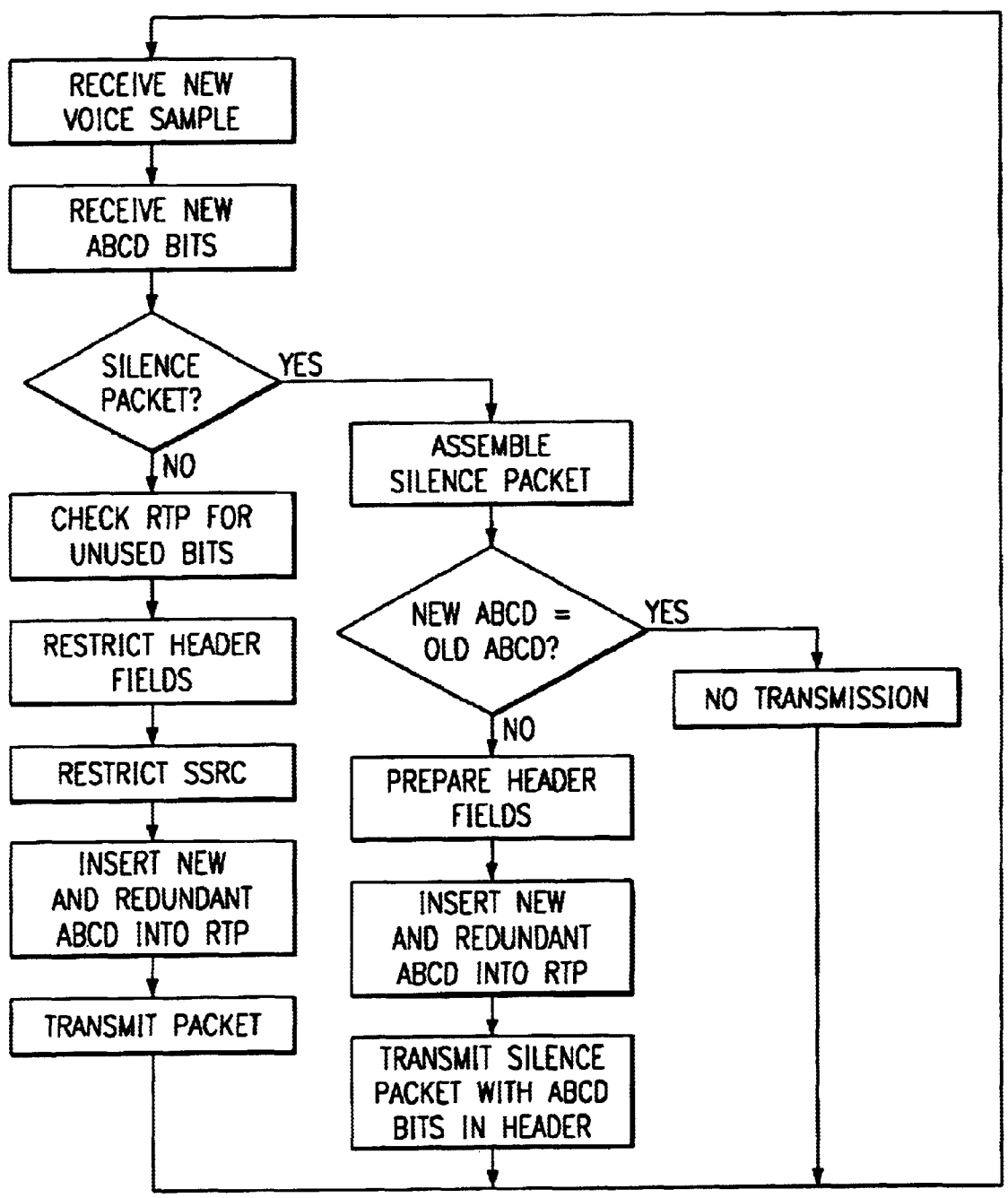
FIG. 3 is a flow diagram illustrating the process for the determination of the location of ABCD bit placement.

In the preferred embodiment of the present invention, ABCD bits are sent in the RTP header. The CC field and the top 20 bits of the SSRC field are used to carry ABCD bits in each RTP packet. The exemplary embodiments described herein illustrate the present invention with 10, 20 or 30 ms size voice packets and a G711 Codec. The exemplary embodiments provide at least and acceptable 5 ms ABCD sample resolution. The invention assumes the MGCP signaling protocol is used to connect telephony ports on s remote gateways with ports on the PSTN gateway, as detailed below.

ABCD bits are reported by the transparent mode interface whenever they change. The gateway maintains the last T ms of ABCD samples (where T is set to a desired time interval, 30 ms in the exemplary embodiment) in order to determine if the ABCD coding had changed and to provide packet loss redundancy. The gateway inserts the ABCD samples into the RTP voice stream. In the case of 10 and 20 ms voice, this provides some redundancy in the event a packet is lost. As voice packets are received, the far end will extract the ABCD bits and forward them to the far end for playout if they have changed since last time.

The ABCD bits are transported in the unused bits of each RTP voice packet header. The basic rate of ABCD generation/playout will be 5 ms. At 4 bits per ABCD sample at a 5 ms ABCD sampling resolution, the transporting of the last 30 ms of ABCD samples will require six samples at 4 bits per sample or 24 bits of the voice packet. The 4 bits of the CC field are utilized first and the most significant 20 bits of the SSRC field are also used to send the six ABCD samples. Table I below provides a description of an exemplary embodiment for ABCD samples per voice packet, as a function of the voice packet size. For example, in the case of 10 ms voice packets, each RTP packet will contain two new ABCD samples (for the past 10 ms) plus a repeat of the four samples for the previous 20 ms period so that some degree of recovery is possible when voice packets are lost. In the case of 20 ms voice packets, four new ABCD samples will be present (for the past 20 ms) plus two repeated samples for the prior 10 ms period. With 30 ms voice packets, no redundancy is possible with the illustrated embodiment, however, if more ABCD samples are transported, requiring a greater number of bits from the SSRC field, redundancy can be achieved at a 30 ms voice packet size. A balance between redundancy and bit size is determined by design considerations.

TABLE I

| VIF Size (ms) | ABCD samples in Voice Packet N | RTP Header bits used (T = time |
|---|---|---|
| 10 | 2 new | CC: ABCD bits at T ms |
|  | 4 repeated | SSRC 31–28: ABCD bits at T-5 ms |
|  |  | SSRC 27–24: ABCD bits at T-10-repeat of pkt N-1 |
|  |  | SSRC 23–20: ABCD bits at T-15-repeat of pkt N-1 |
|  |  | SSRC 19–16: ABCD bits at T-20-repeat of pkt N-2 |
|  |  | SSRC 15–12: ABCD bits at T-25-repeat of pkt N-2 |
| 20 | 4 new | CC: ABCD bits at T ms |
|  | 2 repeated | SSRC 31–28: ABCD bits at T-5 ms |
|  |  | SSRC 27–24: ABCD bits at T-10 ms |
|  |  | SSRC 23–20: ABCD bits at T-15 ms |
|  |  | SSRC 19–16: ABCD bits at T-20-repeat of pkt N-1 |
|  |  | SSRC 15–12: ABCD bits at T-25-repeat of pkt N-1 |
| 30 | 6 new | CC: ABCD bits at T ms |

TABLE I-continued

| VIF Size (ms) | ABCD samples in Voice Packet N | RTP Header bits used (T = time |
|---|---|---|
|  |  | SSRC 31–28: ABCD bits at T-5 ms |
|  |  | SSRC 27–24: ABCD bits at T-10 ms |
|  |  | SSRC 23–20: ABCD bits at T-15 ms |
|  |  | SSRC 19–16: ABCD bits at T-20 ms |
|  |  | SSRC 15–12: ABCD bits at T-25 ms |

In all cases, the 4 bits of the CC field will hold the most recent ABCD sample, the top 4 bits of SSRC will hold the next newest sample, and so on. With a Voice file size of 30 ms, the SSRC that will be generated will be restricted to 12 bits. The 12 bit size restriction will not effect the performance of the SSRC because the method of the present invention is designed to connect endpoints to the PSTN only. In this application, a call consists of one bidirectional RTP stream without conferencing/mixing of RTP streams at the endpoint, thus SSRC becomes largely irrelevant.

In the exemplary embodiment, interpretation of ABCD bits are for on-hook and off-hook conditions can be detected, and, in the case of off-hook, reported to the call agent. In the illustrated exemplary embodiment, ABCD bits have the following meaning, as per EIA-TIA-464A, many other implementations will be apparent to one skilled in the art:

TABLE II

| TRANSMIT | A | B | C | D |
|---|---|---|---|---|
| Loop open (on hook) | 0 | 1 | Same as A | Same as B |
| Loop closed (off hook) | 1 | 1 | Same as A | Same as B |
| RECEIVE | A | B | C | D |
| Ringing | 0 | 0 | Same as A | Same as B |
| Not Ringing | 0 | 1 | Same as A | Same as B |

If the loop is closed (off hook), the B bit on the receive side will be ignored.

As discussed above, the detection of silence in the voice packet has a direct reduction in the transport of ABCD packets. If VAD is activated, packet transmission can be suspended when no voice is detected. The present invention teaches the creation of SID packets if the ABCD bits change during a silence period, and inserting ABCD bits into the SID packet header. Because the transport of SID packets will disrupt the sequence numbering of the RTP stream, SID packets are dropped at the receiving end after the ABCD bits are extracted, without the packet being forwarded to the gateway DSP. Alternatively, dummy RTP voice payload packets can be created and the ABCD bits are inserted into the RTP header. A further alternative for transport of ABCD packets during silence, uses the RTP DTMF relay packet format to carry the ABCD bits. Alternatively the ABCD bits can be sent in the RTCP channel using a specific format recognized at the receiving end.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

We claim:

1. A system for transporting ABCD signaling bits between terminating equipment over a packet network, comprising the steps of:

identifying ABCD bits generated from a first terminating equipment;

identifying a voice packet assembled from the output of said first terminating equipment and having a packet header and data;

identifying an unused part of the packet header of said identified voice packet;

placing a current ABCD bit set into said unused header part;

receiving said packet with said current ABCD bit set;

extracting said ABCD bits; and providing said ABCD bits to a second terminating equipment.

2. The system of claim 1, further comprising the steps of:

restricting the field use of a second header part of said identified voice packet, into allocated and non-allocated portions; and placing a previous ABCD bit set into said non-allocated field portion.

3. The system of claim 2, wherein:

ABCD bits are sampled from said first terminating equipment output at a regular interval according to the requirements of said packet network.

4. The system of claim 3, wherein:

an ABCD bit set is assembled from each regular interval sample;

said current ABCD bit set is the set assembled from the most recent sample; and said previous ABCD bit set is the set assembled from the sample prior to the most recent sample.

5. The system of claim 4, wherein:

redundancy is achieved by inclusion of additional previous ABCD bit sets assembled from samples prior to the previous sample.

6. The system of claim 5, wherein:

the number of ABCD bits sets required per packet for continuous transmission of sampled ABCD bits is equal to the packet length divided by the length of the regular interval of the ABCD bit sampling; and the redundancy rate is determined by the number of ABCD bit sets included in each packet header minus the required number of ABCD bits.

7. The system of claim 3, wherein:

the number of ABCD bits sets required per packet for continuous transmission of sampled ABCD bits is equal to the packet length divided by the length of the regular interval of the ABCD bit sampling.

* * * * *